United States Patent
Papa (10) Patent No.: US 10,708,651 B2
(45) Date of Patent: Jul. 7, 2020

(54) DYNAMIC CONTENT RATINGS

(71) Applicant: Comcast Cable Communications, LLC, Philadelphia, PA (US)

(72) Inventor: Ilirjan Papa, Drexel Hill, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 8 days.

(21) Appl. No.: 14/296,113

(22) Filed: Jun. 4, 2014

(65) Prior Publication Data
US 2015/0358677 A1 Dec. 10, 2015

(51) Int. Cl.
*H04N 21/442* (2011.01)
*H04N 21/254* (2011.01)
*H04N 21/258* (2011.01)

(52) U.S. Cl.
CPC .... *H04N 21/44204* (2013.01); *H04N 21/2541* (2013.01); *H04N 21/25816* (2013.01); *H04N 21/44213* (2013.01)

(58) Field of Classification Search
CPC .. H04H 60/43; H04H 60/33; H04N 21/44222; H04N 2007/1739; H04N 7/17309; H04N 21/42201; H04N 21/4394; H04N 21/44008; H04N 21/42203; H04N 21/4223; H04N 21/4402; H04N 21/84; H04N 5/44543
See application file for complete search history.

(56) References Cited

U.S. PATENT DOCUMENTS

| | | | |
|---|---|---|---|
| 2002/0078441 A1* | 6/2002 | Drake | H04N 7/17318 725/9 |
| 2002/0083451 A1* | 6/2002 | Gill | H04N 7/165 725/46 |
| 2003/0028884 A1* | 2/2003 | Swart | H04N 7/17318 725/51 |
| 2005/0246739 A1* | 11/2005 | Davidson | H04N 5/44 |
| 2011/0072448 A1* | 3/2011 | Stiers | H04N 7/17318 725/10 |
| 2011/0138010 A1* | 6/2011 | Rehiman | H04N 21/44213 709/217 |
| 2011/0307393 A1* | 12/2011 | Galuten | G06Q 10/087 705/304 |
| 2012/0059825 A1* | 3/2012 | Fishman | G06F 17/30053 707/737 |
| 2012/0222063 A1* | 8/2012 | Mao | H04N 21/2347 725/31 |
| 2013/0104024 A1* | 4/2013 | Rajkumar | G06F 17/00 |
| 2013/0145016 A1* | 6/2013 | Vantalon | G06F 15/173 |
| 2013/0191401 A1* | 7/2013 | Xia | G06F 17/30 |
| 2013/0247084 A1* | 9/2013 | Vinson | H04N 21/44204 |
| 2014/0279075 A1* | 9/2014 | Massoudi | G06Q 30/0251 705/14.73 |
| 2014/0337298 A1* | 11/2014 | Kandekar | G06F 17/30 707/688 |
| 2015/0095329 A1* | 4/2015 | Sanio | G06F 17/30038 707/732 |

* cited by examiner

*Primary Examiner* — Anthony Bantamoi
(74) *Attorney, Agent, or Firm* — Banner & Witcoff, Ltd.

(57) ABSTRACT

According to some aspects, methods and systems may include determining that events associated with requests or accessing content items have occurred. The methods and systems may also include authorizing transmission of the content items to the requesting devices based on credential information associated with the requests, and determining a viewership quantity metric associated with the requests.

20 Claims, 5 Drawing Sheets

DYNAMIC CONTENT RATINGS

BACKGROUND

Content providers have long sought to determine how to produce accurate content ratings representing viewership habits of a plurality of groups or samples of users. There is an ever-present need to accurately produce content ratings across many different types of content and platforms. These needs and others, such as how to acquire ratings in a quicker and more efficient manner, are addressed in the disclosure.

SUMMARY

The following summary is for illustrative purposes only, and is not intended to limit or constrain the detailed description.

One aspect of the disclosure relates to determining that an event associated with accessing a content item has occurred, e.g., at one or more user devices, and accessing or receiving a communication associated with the event. The aspect may also include authorizing and setting up one or more content streams comprising one or more content items for transmission to one or more user devices. Credential information such as access rights associated with the one or more devices or their users may be checked. An amount of authorized streams and/or amount of access rights may be used to determine viewership data.

One or more aspects of the disclosure relate to determining that one or more events associated with accessing one or more content items have occurred, and generating or receiving messages associated with the plurality of events. The method may also include authorizing and setting up content streams comprising the plurality of content items for transmission or consumption, which may be done based on credential information associated with the request. Viewership statistics related to any or all of the foregoing steps are gathered and analyzed.

One or more aspects of the disclosure also relate to comparing content information associated with a content item to account information associated with an account, and when the account information satisfies a requirement, transmitting, from a computing device, a stream of content to a device, and determining a popularity for the content.

One or more aspects of the disclosure also provide a method based at least on collected data for determining that a first event associated with accessing content has occurred, e.g., at a user device, and in response to or during the authorization of the content transmission to the user device, determining or updating a viewership quantity associated with the content. The method may also include receiving one or more second events indicating the user device is accessing or interacting with the content. In response to determining that the one or more second events is no longer being received from the user device, for example, the method may comprise modifying the viewership quantity associated with the content.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
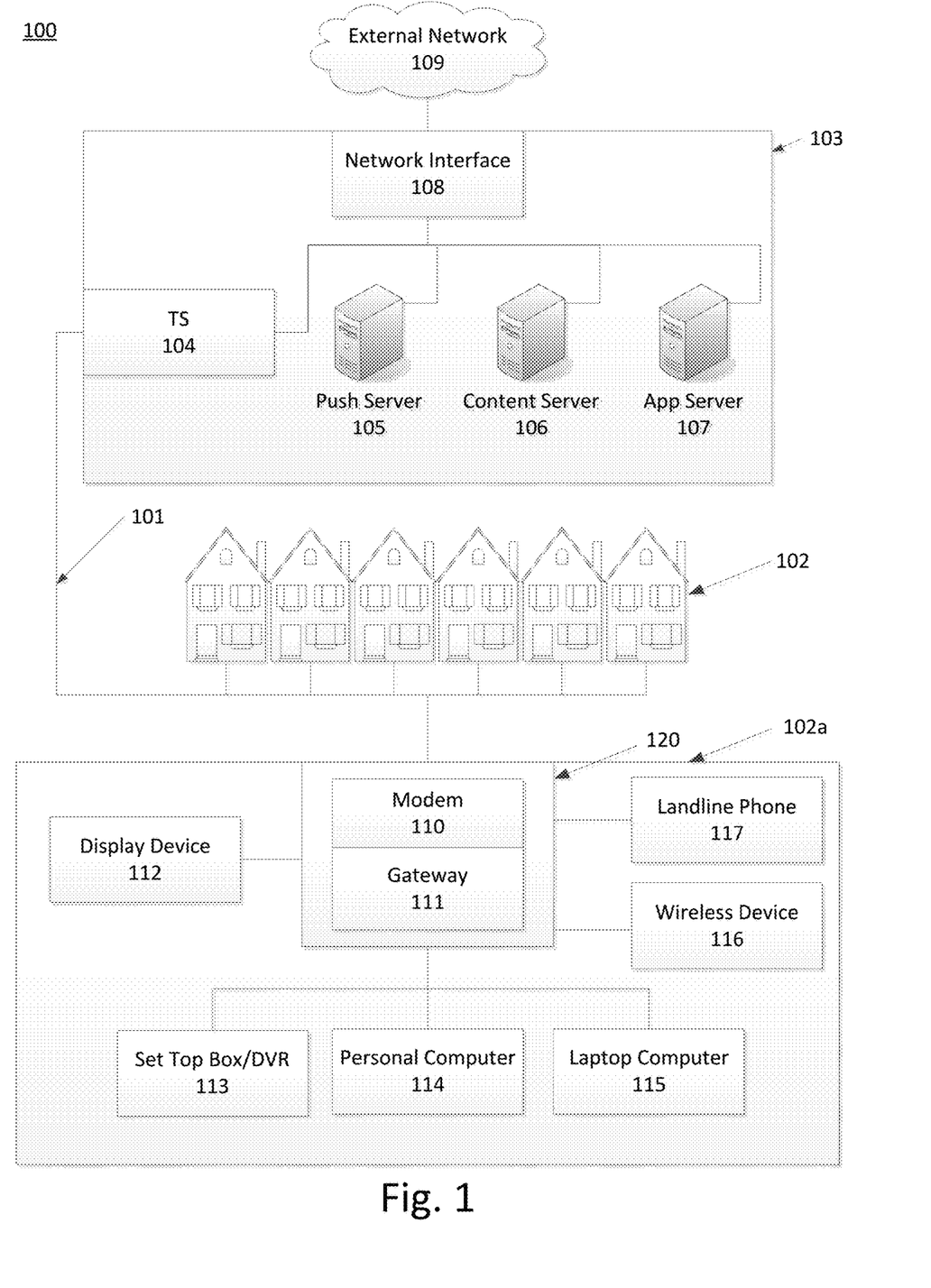
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
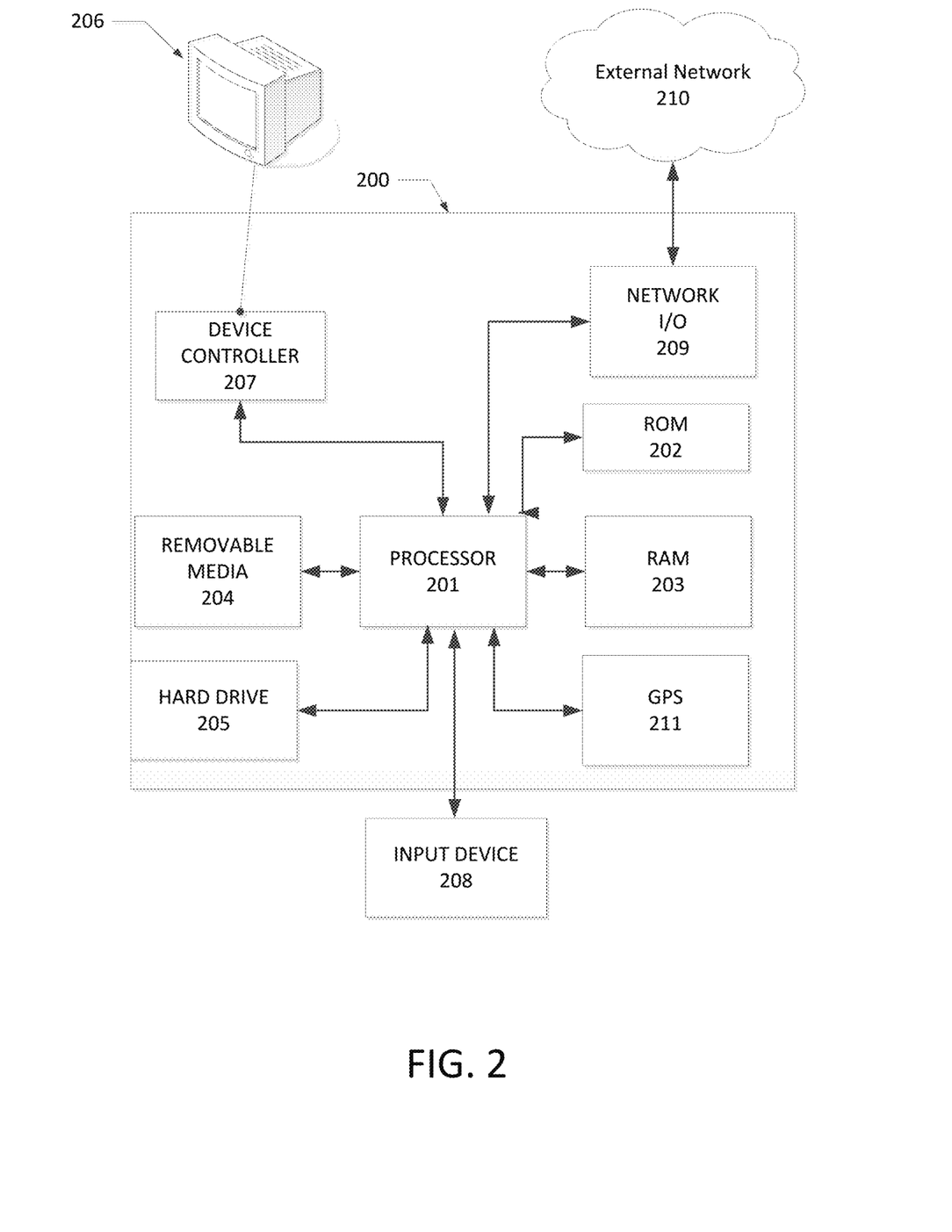
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television or internal display), and may include one or more output device controllers 207, such as a video processor or audio processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
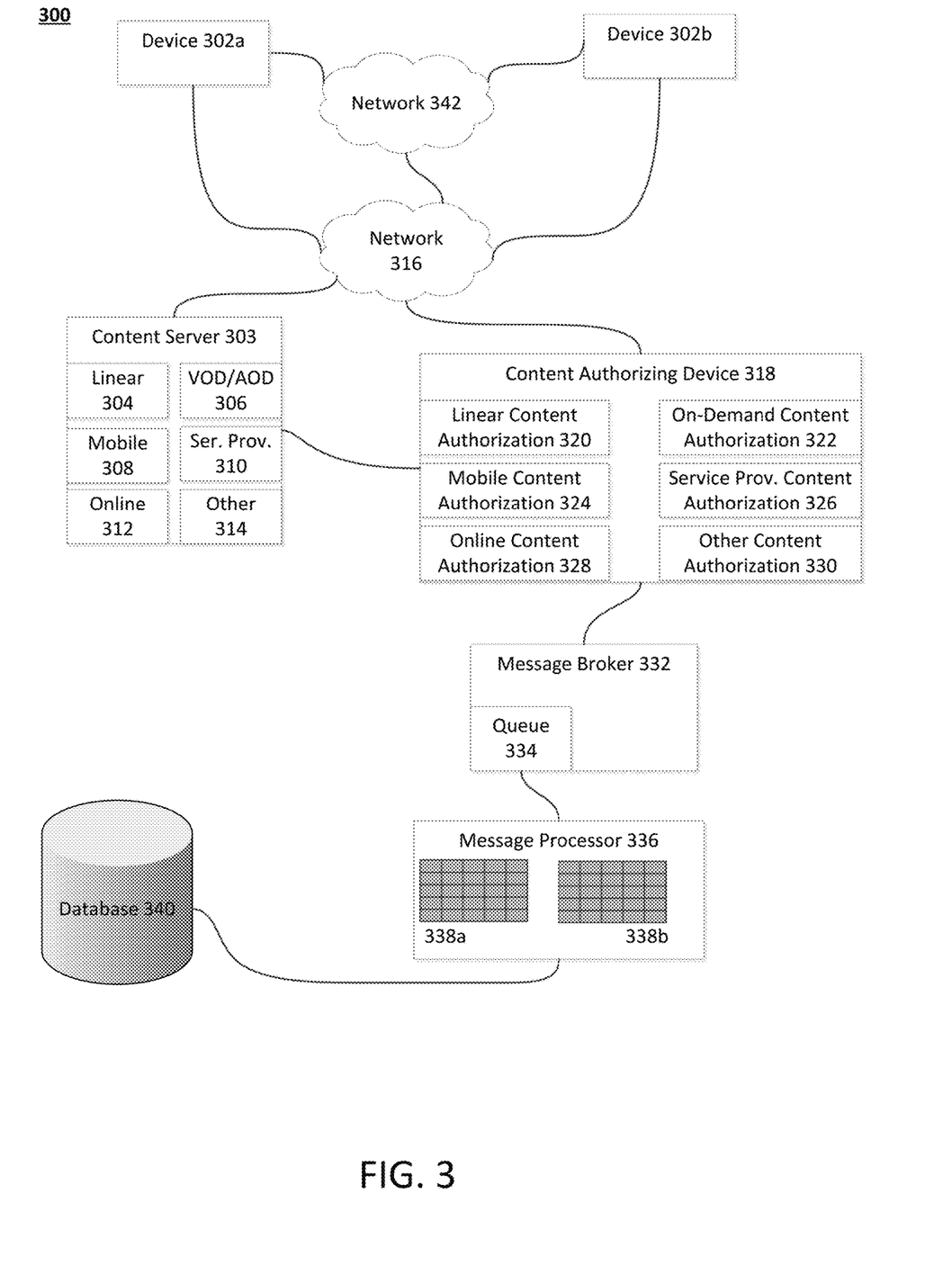
FIG. 3 illustrates an example system in accordance with some aspects of the present disclosure.

FIG. 3 illustrates an example system 300 in accordance with an aspect of the disclosure. System 300 may include devices 302a and 302b, which may be substantially similar to or the same as computing device 200 as shown in FIG. 2. Examples of devices 302a and 302b are user devices such as a smart phone, tablet, set-top box 113, personal computer 114, laptop computer 115, gateway 111, modem 110, landline phone 117, display device 112, wireless device 116, or the like. Devices 302a and 302b may be operably connected to each other via a local network 342. Local network 342 may comprise, be substantially similar to, or be the same as network 100, link 101, external network 109, and/or external network 210 as shown in FIGS. 1 and 2. System 300 may also include a content authorizing device 318, which may be operably connected to devices 302a and 302b via network 316. Network 316 may comprise, be substantially similar to, or be the same as network 100, link 101, external network 109, and/or external network 210 as shown in FIGS. 1 and 2. System 300 may also include a content server 303, which may be complemented with any computing device, and which may be substantially similar to or the same as content server 106 as shown in FIG. 1. Content server 303 may be operably connected to devices 302a and 302b, content authorizing device 318, and network 316. System 300 may also include message broker 332, which may be operably connected to content authorizing device 318. System 300 may also include a hardware or software device such as message processor 336 and database 340, each of which may be operably connected to message broker 332. Each component of system 300 may be operably connected to and/or interact with each other via a direct and/or indirect connection, such as via a network or hardwire. Each component of system 300 may be affiliated, operably connected to, and/or located at a service or content provider, such as local office 103.

Devices 302a and 302b may be similar to computing device 200, and may be located at a location, such as premises 102a. In this exemplary figure, two user devices are shown. However, any number of user devices, such as one or hundreds, may be included in system 300 and/or in any of the embodiments disclosed herein. Additionally, devices 302a and 302b may be located at a same or similar location, such as premises 102a, or may be located at different locations. In some embodiments, devices 302a and 302b may be a set-top box, a mobile device (such as a smartphone, tablet, or laptop), personal computer, digital video recorder, digital video player, wireless device, landline phone, audio device, or any other device capable of providing or accessing media and/or content.

Devices 302a and 302b may provide and/or access content services, such as video/image content services, audio content services, internet content services, and the like. Devices 302a and 302b may access content services and other services via, for example, a video processor or audio processor (e.g., similar to device controller 207) and may display content on a display (e.g., similar to display 206 as shown in FIG. 2). For example, devices 302a and 302b may access content via a launched application on devices 302a and 302b Devices 302a and 302b may access content on any number of content platforms, which may include a linear content platform, media (video/audio) on-demand content platform, mobile content platform, a service provider-specific content platform, an online content platform, or other content platform that may be capable of providing content on devices 302a and 302b, or combinations thereof. For example, device 302a may be a mobile device, and may provide content, such as a movie, through a mobile application. In such a scenario, the content may be provided through a mobile content platform. In another example, device 302b may be a set-top box, and may provide content, such as a television program or show, using linear content (e.g., live broadcast). In such a scenario, the content may be provided through a linear content platform. In yet another example, device 302a may be a set-top box, and may provide content, such as a song, using a media on-demand content platform, and/or may provide content, such as an internet video, using an online content platform. A service provider may provide content that may be specific for that service provider with the service provider's own content platform. For example, content provided on a service provider content platform may be customized by a service provider for a particular user device and/or user, such as providing a user's favorite part of a movie. Additionally, content provided on a service provider content platform may be a combination of various other platforms, such as combining online content with linear or video on-demand content. Any other content platform may also be included in devices 302a and 302b.

Devices 302a and 302b may be connected to one another via a network, such as local network 342, which may be established by a media access device (e.g., a cable modem) or established via another connection such as a cellular connection. Devices 302a and 302b may also be connected to other devices and entities, such as a service provider (similar to office 103) and/or content server 303, via a network, such as network 316. Local network 342 and network 316 may be similar to network 100 and/or link 101, and may be, for example, wireless, a MoCA in-home coaxial cable network, cellular network, mobile device network, an Ethernet network, a Wi-Fi network, and the like. Network 316 may be associated with a content or service provider, such as office 103. In such scenarios, the service provider (via, e.g., content server 303) may transmit content and other information/messages via network 316 between, for example, a client device and a service provider (or other component associated with a service provider). In some embodiments, local network 342 may enable clients 302a and 302b to connect to a network associated with a service provider, such as network 316, which may allow access to the service provider's network resources, such as content server 303. For example, device 302a may be a mobile device and may request content from a service provider, such as local office 103, by sending a requesting message via local network 342 (which may be established via a cable mobile and/or a wireless connection). Local network 342 may then connect to a service provider's network 316, which may then be connected to various resources of the service provider, such as content server 303. Then, the requested content may be transmitted from the service provider via network 316 and via network 342 to device 302a.

Content server 303 may be a computing device similar to content server 106. Content server 303 may be configured to provide content, such as video, audio, and internet, to users at a premises, such as premises 102a, to a user device, such as devices 302a and 302b. Content server 303 may provide platform specific content using one or more platform specific content servers, such as linear content server 304, media (e.g., video and audio) on-demand server 306, mobile content server 308, service provider specific content server 310, online content server 312, other content server 314, or combinations thereof. For example, content server may transmit a stream of linear content (such as a television show) via network 316 to device 302a, where device 302a may use a linear content platform application to access the content stream. In some embodiments, content server 303 may transmit content to a user device in response to receiving authorized signal generated by, for example, content authorizing device 318.

Content authorizing device 318 may be a computing device and associated software comprising a content prioritization system, which may manage access and/or be a gateway to content provided by a service provider, such as local office 103, and/or content server 303. Content authorizing device 318 may be a server or processor. Content authorizing device 318 may be located at local office 103 and/or be connected or controlled by local office 103. Devices 302a and 302b may be connected to content authorizing device 318 via network 316 (and/or additionally local network 342). Content authorizing device 318 may determine and check credential information of a user or associated device after, for example, the user or associated device requests content from local office 103. Based on this credential information, content authorizing device 318 may then either authorize or not authorize transmission or access to one or more content streams that include the requested content (e.g., authorize content server 303 to transmit the one or more streams). If content authorizing device 318 does authorize the content stream, the content stream may then be transmitted, e.g., from content server 303, to, e.g., the device via network 316.

The credential information may include various information such as what content a user or device may be entitled to access, what accounts a user device may be associated with, billing information related to the user device, and the like. For example, an account may be associated with one or more users that may reside at premises 102a. The account may have one or more user devices associated or affiliated with it. Additionally, the account may be associated with a location for services provided by local office 103, which may include an address for any person, device, or premises associated with the account. For example, a family may have an account for services provided by local office 103. The family may have 5 devices, such as 3 set-top boxes, a mobile device, and a computing device, registered and/or associated with the account. The account may also associate the family's residence address or location with one or more of their devices. Additionally, credential information may include Media Access Control (MAC) addresses for devices 302a and 302b. In one example, content authorizing device 318 may determine whether an account associated with a device is paying for a service, such as a premium movie channel, and may subsequently transmit a content stream that includes content (such as movies) provided by that premium movie channel. These aspects will be discussed below in further detail.

Content authorizing device 318 may include one or more platform specific content authorization systems, such as linear content authorization system 320, media (video/audio) on-demand content authorization system 322, mobile content authorization system 324, service provider specific content authorization system 326, online content authorization system 328, and any other content authorization system 330. In some embodiments, there may be more than one content authorizing device 318, each of which may include one or more platform specific content authorization systems. Each of these platform specific content authorization systems may authorize content streams for their respective content platform. Thus, in some embodiments, transmission of a stream of content may be authorized by one of the platform specific content authorization systems depending on for which content platform a user device, such as devices 302a and 302b, requests content. For example, device 302a may be a mobile device and may request mobile content to be provided on a mobile content platform. Thus, device 302a may transmit a message to content authorizing device 318, that may include information such as a requested content item's identification or name, a time associated with the request for access to the content item (e.g., the time of an initial (or subsequent) content request), a device identification (e.g., identifying the user device as a smartphone, a particular user's smartphone, or a particular account's smartphone), and/or the platform on which the requested content is to be provided. After this message is transmitted via, for example, network 316 to a content authorizing device 318 (which may be located at service provider, such as office 103), content authorizing device 318 may then process the message and determine which platform the request is for and any other information needed for the content stream authorization process (such as credential information). Using the message's content platform information, content authorizing device 318 may then send the message to the corresponding platform specific content authorization system. In this example with the mobile device requesting mobile content, the request message may be sent to mobile content authorization system 324, which may then use any information, such as credential information, to determine if the mobile device is authorized to access the requested content.

In some embodiments, devices 302a or 302b may transmit a message to content authorizing device 318 after generating an event associated with accessing content. For example, a message may be transmitted from device 302a to content authorizing device 318 after a user using device 302a requests access to content by, for example, indicating a "play" or "restart" option for the content. Thus, a message, which may include information identified above, may be transmitted to content authorizing device 318 indicating that the user has requested access to content (e.g., requested to play or restart the content). The request to play or restart content may be called an event (a start event or restart event).

In some embodiments, the message transmitted from devices 302a or 302b to content authorizing device 318 may indicate that a user device is currently accessing content or has stopped accessing content. For example, after content authorizing device 318 and/or content server 303 has transmitted a content stream comprising a requested program to an authorized device 302a, device 302a may begin to access/play/display the content. In such an example, while the content is being accessed on device 302a, device 302a may generate signals or events that indicate the content is currently being accessed and has not, for example, ceased being accessed. Such events may be called heartbeat events, and may be transmitted to content authorizing device 318 via a message. If a user stops accessing the content on device 302a, such as by pressing a stop button, heartbeat events may stop, thus indicating that the device has stopped accessing (or playing) the content. Thus, any subsequent messages transmitted by device 302a and received by content authorizing device 318 may not include heartbeat events related to that content. Alternatively, content authorizing device 318 may not receive any messages because heartbeat events are no longer generated. In some embodiments, content authorizing device 318 or local office 103 (or any component associated with local office 103) may determine using heartbeat events at which point a user device has stopped accessing content. Heartbeat events may be generated periodically or at irregular intervals by a user device, and messages indicating heartbeat events may also be sent periodically or at irregular intervals. Messages transmitting heartbeat events may include any of the information included in any of the messages transmitted from a user device to content authorizing device 318, as described above. These aspects will be discussed below in further detail. In some embodiments, interactive activity of a user or user device may be monitored after authorizing a content stream.

Message broker 332, which may be connected to content authorizing device 318 via a network or other connection, may be a computing device such as a server that may monitor content authorizing device 318 for messages that content authorizing device 318 may have received from a user device. Additionally, these messages may include data indicating whether a content stream was or was not authorized by content authorizing device 318 for transmission, and any data associated with the authorization process. Content authorizing device 318 may transmit messages to message broker 332 whenever content authorizing device 318 receives messages from devices 302a or 302b. In some embodiments, content authorizing device 318 may transmit a message to message broker 332 in the event that content authorizing device 318 authorizes a stream of content to a user device that, for example, transmitted that message to content authorizing device 318. In some embodiments, content authorizing device 318 may use location information, such as the host name, and/or protocol (e.g., Advanced Message Queuing Protocol (AMQP), FTP, etc.) associated with message broker 332 when transmitting messages to message broker 332.

Message broker 332 may aggregate messages in a queue 334, and then may transmit or transfer the aggregated messages to a location or message processor, such as to message processor 336. Message processor 336 may be a server or processing unit that may request messages from message broker 332, and in turn, message broker 332 may transfer the aggregated messages to message processor 336. The transfer of the aggregated messages may be done one at a time, such that one message event is transmitted (e.g., via queue 332) to message processor 336 followed by another message event. Alternatively, a bulk transfer of messages may be transferred from message broker 332 (e.g., via queue 334) to message processor 336. According to some aspects, message processor 336 may communicate with message broker 332 and request one or more messages received from device 302a or 302b indicating one or more of the content platforms that was requested by device 302a or 302b. Message processor 336 may then process and analyze these messages for information, such as content identification or name, a time associated with an event, a device identification, and/or the platform on which the requested content is to be provided. Message processor 336 may then use the messages to update, for example, a count associated with a particular element of interest associated with a content item, such as the number of devices accessing content via a particular platform, the number of devices accessing a particular content item, the number of devices associated with an account accessing content, the number of accounts using a particular platform, and the like.

Message processor 336, or another device associated with (e.g., receiving data from) the message processor 336, may then determine a viewership quantity metric based on these counts and/or other information. Examples of a viewership quantity metric may be the total number of devices or users currently tuned to a show, total number of users or the total number of smartphones accessing a particular segment of a show last Saturday at 4:14 PM, or a total number of a particular device currently accessing linear content, or a number of a particular device in a particular location (e.g., users in Washington D.C., a location associated with an account, or multiple locations associated with one or more accounts) using a service provider specific content platform to currently access a particular content, and the like. In some embodiments, the viewership quantity metric may include a ratings and/or popularity of an item of content. Such ratings and/or popularity may be determined for particular devices, such as ratings for, for example, only smartphones or set-top boxes, or device combinations thereof. Such ratings and/or popularity may be determined for particular platforms, such as how many devices are currently accessing an item of content on, for example, a mobile content platform or on a linear content platform, or on content platform combinations thereof. Such ratings and/or popularity may be determined for particular accounts or locations associated with devices, such as how many devices in or associated with a household or an account are currently accessing an item of content or using a particular platform. Any number of viewership quantities may be determined using combinations of the above examples and examples not explicitly listed herein.

Message processor 336 may keep track of and/or store information related to the viewership quantities in an in-memory data representation, which may be in the form of one or more in-memory grid representations, shown by grids 338a and 338b. In-memory grid representations may comprise data that may be stored in the RAM of, for example, servers. The grid representations may be object-based, and additionally may be non-relational and the like. Such in-memory grid representations may be written on .NET or Java application platforms. In these embodiments, using RAM may result in faster computation of a viewership quantity metric. The in-memory grid representations 338a or 338b may be in the form of a matrix. In one example, a column or row of the matrix may represent a content item, such as one show or program, a content platform, a time that describes when content was requested by a user device, location information, and the like. Using in-memory grid representations 338a or 338b, any number of viewership quantities may be determined. These aspects will be discussed below in further detail. While described above as using an in-memory grid representation, in some embodiments, relational databases, hard disk, Hadoop clusters, or other sources of storage may be used by message processor 336 to keep track of and/or store information.

Message processor 336 may be connected to database 340, which may be used to store information used by message processor 336 to determine viewership quantities. For example, historical data, such as the number of devices that accessed a particular show on a mobile content platform in Chicago, Ill. on a particular, may be stored in database 340. The information or data stored in database 340 may be a snapshot or copy of any in-memory data, such as a snap shot of in memory grid representations 338a or 338b. In some embodiments, database 340 may be a relational database. According to some aspects, database 340 may request and store information from message processor 336 periodically or non-periodically. For example, database 340 may request and store information every hour, every five minutes, every week, or at irregular intervals. In some embodiments, message processor 336 may delete messages after receiving them from message broker 332. In such situations, these messages may follow a file and forget protocol.

Figure 4:
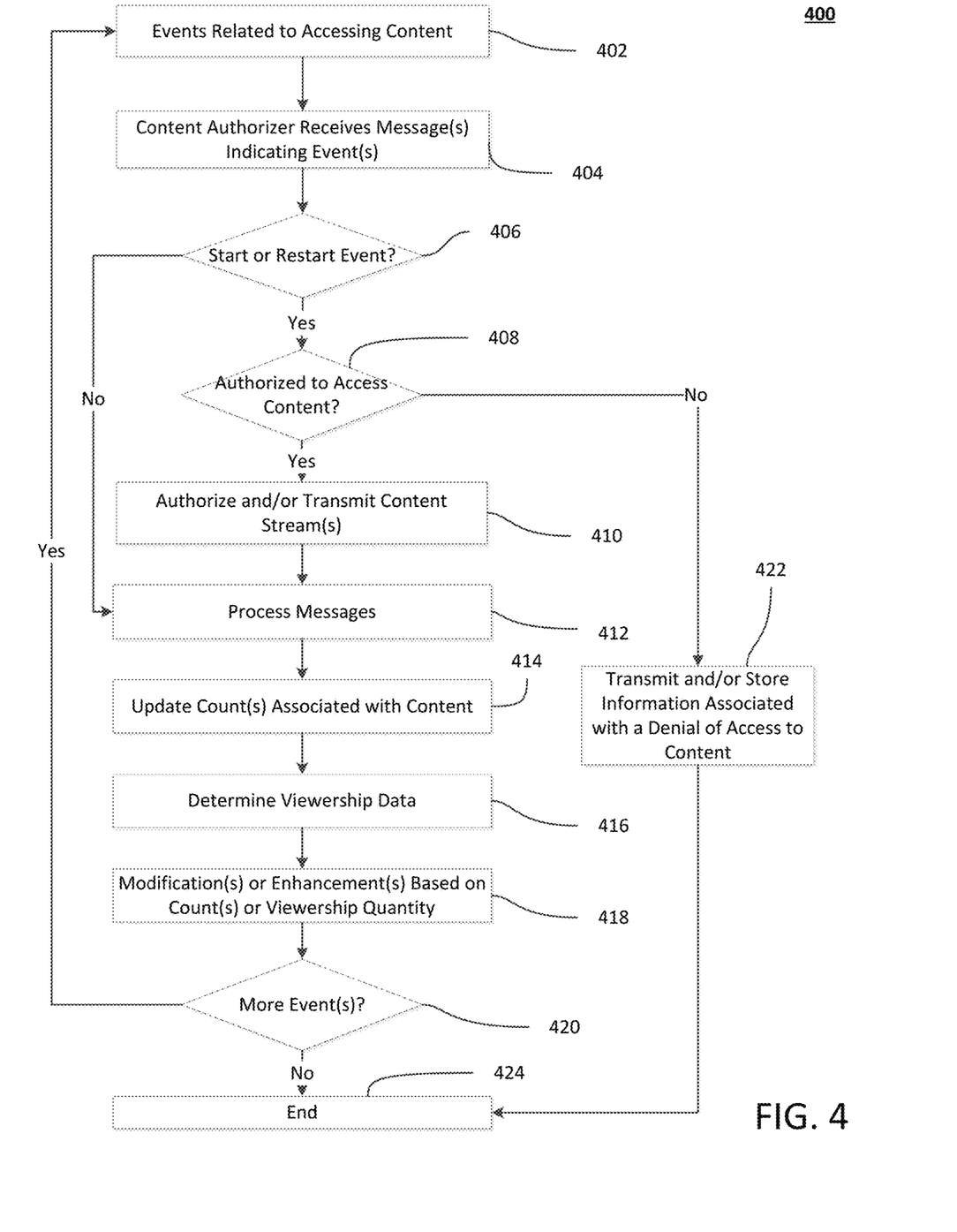
FIG. 4 illustrates an example flow diagram of a method in accordance with some aspects of the present disclosure.

FIG. 4 is an exemplary flow diagram illustrating an example process 400 in accordance with one or more disclosed features described herein. In one or more embodiments, the process illustrated in FIG. 4 and/or one or more steps thereof may be performed by one or more computing devices (e.g., devices 302a or 302b, content server 303, content authorizing device 318, message broker 332, message processor 336, database 340, and the like). In other embodiments, the process illustrated in FIG. 4 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

In the example provided, process 400 may begin with step 402, in which one or more users or devices requesting access to one or more content items from a service provider (such as local office 103) may generate one or more events related to accessing the one or more content items. An event may be, for example, a start event that may indicate that device 302a requested initial access to content item, such as when a user selects a new show or audio to be played by device 302a. An event may also be a subsequent request to access content, which may be called a restart event. For example, after a content item has stopped playing on device 302a because, for example, a user may have pressed pause/stop, a user may restart the content item to continue accessing it. Other events may be associated with a user device performing trick mode operations on a content item. Such trick mode operations may include pause, rewind, fast forward, slow motion, resume, fast rewind, slow forward, slow rewind, jump to previous/future frame, and the like. Thus, an event may be generated by device 302a after a user has applied a trick mode operation to a content item. As will be discussed below in more detail, trick mode events may be useful for determining, for example, which areas of a program a user may have skipped or watched again.

Additionally, an event may be a heartbeat event. An example of a heartbeat event may be an acknowledgement by device 302a that content is still being accessed by device 302a. For example, while content is being accessed/played on device 302a, a heartbeat event may indicate that content is currently being accessed/played. After a content item has stopped playing on device 302a because, for example, a user may have pressed pause/stop, a heartbeat event may indicate that the content is not currently being accessed/played. If the user begins to access the content again, a heartbeat event may then indicate that the content is currently being accessed/played. A heart beat event may be generated by device 302a automatically, or may be generated manually by user input, such as having a user acknowledge that the user is still watching the content by, for example, using an input device.

In some embodiments, an event may indicate that a user device, such as device 302a, has completed accessing a complete content item. For example, a content item may have a predefined length, such as a thirty minute show. After a user using device 302a watches the whole thirty minute show, an event (e.g., called an end event) may be generated indicating that the show has completed. In that case a count (which will be discussed later) that may be associated with that show may be adjusted based on end events (e.g., by subtracting from or adding to the count after receiving an end event).

In some embodiments, heartbeat events may indicate that a user device, such as device 302a, has substantially completed accessing a complete content item. In such situations, a service provider may associate a threshold in order for a show to be counted as a completely watched show. For example, a threshold may be set at 60% of a watched show. Thus, if a user using user device 302a to access a show decides to stop accessing the show, device 302a may not generate any subsequent heartbeat events. However, if the user watched 60% of the show, device 302a may still generate an end event because the content was accessed for at least the percentage specified in the threshold. If a user does not watch 60% of a show, and then decides to stop accessing it (thus, ending heartbeat events), device 302a may not generate an end event because the content was not accessed for at least the percentage specified in the threshold.

According to one example, device 302a may request access to a first content item on a first content platform (e.g., linear), and request access to a second content item (which may or may not be the same as the first content item) on a second content platform (e.g., mobile), and request access to a third content item (which may or may not be the same as the first or second content items) on a third content platform (e.g., online). In such an example, an event may be generated, for example, each time device 302a requests access to content on a different content platform and/or requests a different content item. Additionally, if device 302a accesses the same content item on three separate platforms, then these sessions may be correlated. For example, device 302a may access a first portion of a content item on a mobile platform (generating heartbeat events), and then stop accessing it (thus not generating any more heartbeat events). The stopping point of the content item may be used as a resume or restarting point if the user decides to continue watching it. Thus, if the user decides to access the same content item again using, for example, an online platform (or mobile platform), the user may resume (e.g., restart event) at the resume or restarting point.

At step 404, one or more messages indicating one or more events has been generated at step 402 may be transmitted, or accessed by, to content authorizing device 318. Messages may be transmitted via network 316 or local network 342. These messages may be transmitted whenever an event takes place at devices 302a and 302b. For example, after device 302a makes an initial request for a content item, thus generating a start event, a message indicating that device 302a is requesting that content may be transmitted from device 302a to content authorizing device 318. In another example, a message may be transmitted to content authorizing device 318 after device 302a generates a trick play operation event. In such situations, the message may indicate that device 302a is, for example, fast forwarding content. In another example, a message may be generated after a heartbeat event is generated. In such situations, the message may indicate that the content is still being accessed and/or that the content has not stopped being accessed. According to some aspects, these messages transmitted from devices 302a and 302b to content authorizing device 318 may include information such as content identification or name, a time associated with an event, a device identification, and the platform on which the requested content is to be provided or is being provided.

At step 406, after receiving a message from, for example, device 302a, content authorizing device 318 may determine if the message indicates that a start or restart event has taken place at device 302a. As stated above, the message may indicate any number of events, such as a start event, restart event, a heartbeat event, a trick play event, and the like. Content authorizing device 318 may analyze the message to determine for which type of event the message is associated with and/or indicates. If it is determined at step 406 that the received message does not indicate a start or restart event, process 400 continues to step 412. If it is determined at step 406 that the received message does indicate a start or restart event, process 400 continues to step 408.

At step 408, after determining that the message indicates a start or restart event, content authorizing device 318 may determine whether the requestor is authorized to access the content. If device 302a is authorized to access the content item, then content authorizing device 318 may instruct content server 303 to transmit a stream of content to device 302a via, for example, network 316. Content authorizing device 318 may process the message transmitted from device 302a to analyze any information transmitted with the message. As stated above, the message may include information such as content identification or name, a time associated with an event, a device identification (including account or location information), and the platform on which the requested content is to be provided or is being provided. Content authorizing device 318, which may be connected to or be located at the service provider (e.g., local office 103) providing access to the content, may analyze credential information associated with device 302a that may be stored at or by, for example, local office 103. The credential information may include an account for services provided by local office 103 that may be associated with one or more devices, such as device 302a. For example, the account may have a subscription to a service provided by local office 103, such as a cable package, a premium movie channel, mobile service, and/or audio service. The account may also indicate that devices associated with the account have access to certain account services. The credential information may also include, to which and what content a user device may be entitled. Additionally, a user may be able to access account services with a device that may not be previously associated with the account by using a login and/or password to log in that previously non-associated device into the account to access network resources of local office 103. In such situations, that device may now have access to all the services provided by the account, and may thus become associated with the account. In some embodiments, the credential information may include a location, such as premises 102a, that may or may not automatically allow access to services that may be approved for that location. For example, local office 103 may allow access to certain services for devices that may be located at a particular premises. Thus, a device requesting access to particular services while the device is located at a particular premises may be allowed access those services. Additionally, a service provider account for services provided by, for example, local office 103 may be associated with a location (e.g., premises 102a), which may include an address for any person, device, or premises associated with the account.

Thus, content authorizing device 318 may determine and check credential information of a user device after, for example, the user device requests content from office 103. For example, content authorizing device 318 may determine from a message transmitted from device 302a that a start event was generated at device 302a, that device 302a requested access to a premium movie, the time of the start event or request (e.g., 5:16 PM), the content platform for which the request was made (e.g., video-on demand), the content identification (e.g., the name of the content—Forrest Gump, and/or the service provider identification), and/or the device identification (e.g., a service provider identification associated with a particular device, that may have been previously assigned). Thus, using any of this information, content authorizing device 318 may determine if device 302a has access to the requested content. For example, an account associated with device 302a may have a subscription to the particular channel that is showing Forrest Gump. Thus, in such a scenario, content authorizing device 318 may analyze that account and determine that device 302a is authorized to access Forrest Gump. In another example, device 302a may request the movie Titanic showing on a different premium movie channel. An account associated with device 302a may not have a subscription to that different premium movie channel. Thus, content authorizing device 318 may analyze that account and determine that device 302a is not authorized to access Titanic. In the above examples, premium channels and movies are used, but disclosed features may be applied to any other content such as video/image content, audio content, internet content, and the like.

In another example, content authorizing device 318 may analyze a location associated with device 302a and determine whether that location (and thus that device 302a) may access requested content that may be authorized for devices at that location. Content authorizing device 318 may use any credential information in the authorization of content requested by a device. In another example, content authorizing device 318 may analyze for which platform the content is being requested by device 302a, and use an account, location, or the like that may be associated with the user device to determine if device 302a is authorized to access the requested content on the requested platform.

According to some embodiments, content authorizing device 318 may include one or more platform specific content authorization systems, such as linear content authorization system 320, media (video/audio) on-demand content authorization system 322, mobile content authorization system 324, service provider specific content authorization system 326, online content authorization system 328, and any other content authorization system 330. Thus, after content authorizing device 318 receives a message from, for example, device 302a, content authorizing device 318 may use one or more of these platform specific content authorization systems to authorize content for transmission to device 302a. Each of these platform specific content authorization systems may authorize content streams for their respective content platform. For example, if device 302a requests content on an online content platform, then content authorizing device 318 may use this information (which may be included in the message transmitted from device 302a to content authorizing device 318) to send a message related to this request transmitted by device 302a to online content authorization system 328.

If it is determined at step 408 that the requesting device is not authorized to access the requested content, then process 400 may continue to step 422. At step 422, a message may be transmitted to message broker 332, message processor 336, and/or database 340 that may include information indicating that the requesting device requested content, but that access was denied. This information may be then be used to determine ratings-type metrics, such as a viewership quantity metric. For example, the number of users or user devices requesting access to content but were denied access to that content may be added to the number of users or user devices requesting access to that content and receiving access to that content (such as described, e.g., with respect to steps 414, 416, and/or 418). This information may be stored and/or processed by, e.g., message broker 332, message processor 336, and/or database 340 (such as described, e.g., with respect to steps 414, 416, and/or 418). Process 400 may then end at step 424. If it is determined at step 410 that the requesting device is authorized to access the requested content, then process 400 continues to step 410.

At step 410, content transmission may be authorized. For example, content authorizing device 318 (and/or office 103) may then instruct content server 303 to transmit to the requesting device (e.g., device 302a) one or more content streams that may include the requested content. For example, after content authorizing device 318 authorizes device 302a, which may have requested access to Forrest Gump from a premium channel using a video on-demand content platform, content authorizing device 318 (and/or office 103) may transmit a message to content server 303 instructing content server 303 to transmit a content stream that may include the content item Forrest Gump. In some embodiments, a content stream may include other content, such as video, advertisements, programs, audio, internet content, and the like. In some embodiments, content transmitted in a content stream may comprise targeted content, such as targeted advertisements. Targeted information may be based on, for example, content metadata (which may be stored at local office 103), demographic data (which may be stored at local office 103), information in the message transmitted from device 302a to content authorizing device 318, or provided by the server provider (such as provided by application server 107), and the like. Device 302a may then access (e.g., provide, play, or display) the requested content item (e.g., the movie Forrest Gump) or any other content transmitted to device 302a from a content stream transmitted by content server 303 (or local office 103).

At step 412, messages may be processed for information related to the authorization of content streams. For example, after content authorizing device 318 determines that the message transmitted from device 302a does not contain a start or restart event at step 406, content authorizing device 318 may transmit a message (which may include information similar to the message received by content authorizing device 318 from device 302a) to message broker 332. Message broker 332 may then transmit the message to message processor 336. The message processor 336 may then process the message to analyze any information transmitted with or associated with the message. In another example, content authorizing device 318 may transmit a message to message broker 332 after content server 303 transmits a stream of requested content to an authorized device 302a at step 410.

In some embodiments, message broker 332 may aggregate the messages transmitted from content authorizing device 318 in a queue 334. The messages may then be transmitted from the queue 334 to the message processor 336 one at a time. Alternatively, content authorizing device 318 may transfer messages to message processor 336 in bulk transfers (e.g., more than one at a time).

The processing of the messages at step 412 by message processor 336 may be similar to the processing of a message at step 408. Information that may be processed from the messages may include information such as which type of event occurred at device 302a (e.g., start event, restart event, trick play event, heartbeat event, and the like), content identification or name, a time associated with an event, a device identification, the platform on which the requested content is to be provided or is being provided, a location associated with a user device or content request, and the like.

At step 414, message processor 336 may then update data, such as counts or other information, associated with a content item, using, for example, the information accessed and/or processed in step 412. In some embodiments, step 414 may occur immediately after step 410. A count may be, for example, an aggregated number of accesses or viewings associated with a content item or number of times a content item has been accessed. Thus, message processor 336 may be increase or decrease a count after message processor 336 receives a message, depending on what is in that message. Message processor 336 may use the processed information from a message to update, for example, a count associated with a particular element of interest, such as the number of devices using a particular platform, types of platforms accessing a particular content item, number of devices accessing a content item, number of devices associated with an account using a particular platform, and the like. In some embodiments, a count may be increased after content authorizing device 318 authorizes a content stream.

In some embodiments, a count may be associated with a start (or restart) event. For example, a count may calculate a total number of start events associated with a show. Thus, for every start event, the count may increase by one. Additionally, a count may take into account heartbeat events. For example, after counting 300 start events for a show corresponding to 300 authorized user devices (amounting to a count of 300 devices accessing that show), heartbeat events (indicating that content is being accessed)

may then be generated at the authorized user devices. Subsequently, messages indicating these heartbeats may be transmitted and processed by content authorizing device 318 and message processor 336. In one example, as long content authorizing device 318 and message processor 336 receive and process the heartbeat events (thus indicating that the devices are still accessing the show), the count may stay at 300 (indicating that 300 devices are currently accessing the show). If one of the user devices stops generating heartbeat events (e.g., a user has pressed a stop button on that user device), then message processor 336 (after receiving a message indicating that that one user device has stopped generating heartbeat events) may decrease the count associated with the show by one to 299. Thus, message processor 336 may use counts to indicate a current number of devices or users currently (or previously) accessing content. Additionally, message processor 336 may indicate any other information that may be associated with devices or user currently (or previously) accessing content.

Counts may also be associated with a particular platform, location, type of device, account, and the like. Message processor 336 may store the counts as in-memory data representations, which may be in the form of one or more in-memory grid representations, shown by grids 338a and 338b in FIG. 3. As stated above, the in-memory grid representations 338a or 338b may be in the form of a matrix. In one example, a column or row of the matrix may represent any information that may have been processed from a message, such as a content item identification (such as a name of a show or program), a content platform, a time that describes when content was requested by a user device, location information, and the like. Alternatively or additionally, message processor 336 may store information (such as historical data) to a database, such as database 340.

At step 416, message processor 336 may then determine a viewership quantity metric based on these counts. In some embodiments, viewership quantity may include a ratings and/or popularity of an item of content. Such ratings and/or popularity may be determined for particular devices, for particular platforms, and/or particular accounts or location associated with devices. Examples of a viewership quantity may be the total number of devices currently tuned to a show, or the total number of smartphones accessing a particular segment of a show on a particular date and/or time, or a total number of a particular device currently accessing a content platform, or a number of a particular device in a particular location, a number of users currently accessing a particular content item, and the like. Any number of viewership quantities may be determined using combinations of the above examples and examples not explicitly listed herein. In some embodiments, step 416 may be performed by another party. For example, viewership-type data (e.g., counts) may be captured and/or offloaded to one or more third parties for analysis. The third parties may then, for example, may use it for various purposes or transmit the analyzed viewer-ship data back to components of system 300.

Figure 5:
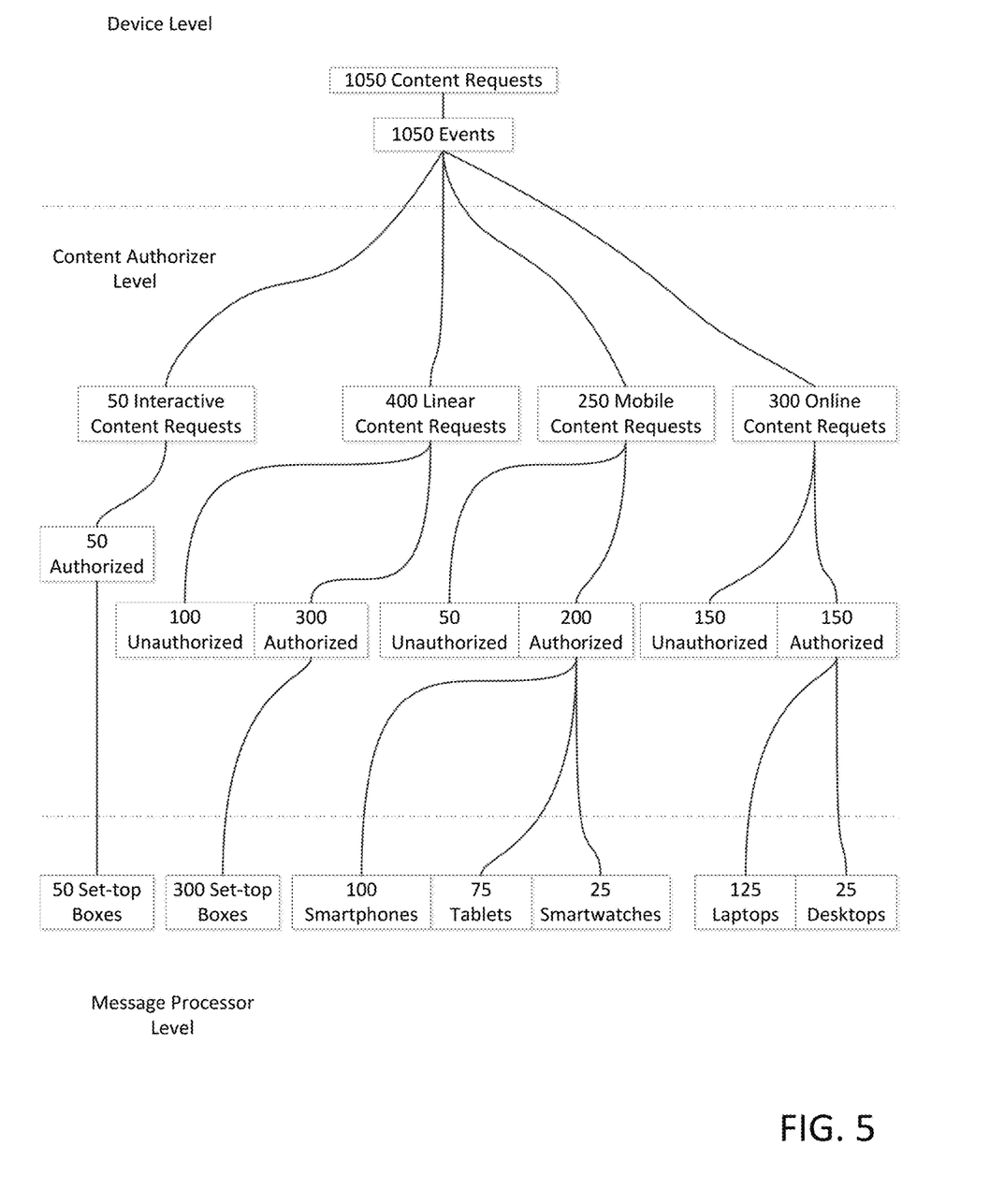
FIG. 5 illustrates an example diagram in accordance with some aspects of the present disclosure.

FIG. 5 illustrates an example of a process flow (e.g., business rules, method) for determining an exemplary viewership quantity metric. On the user (e.g., client) device level, 1050 user devices (e.g., similar to devices 302a and 302b) may each transmit one request for access to various content items (e.g., 1050 requests). These 1050 requests may each be associated with an event (such as a start event, restart event, trick play event, interactive event, and the like). Each user device may transmit to content authorizing device 318, which may be a software and/or a hardware component, a message containing information such as which type of event occurred at that user device (e.g., start event, restart event, trick play event, interactive event, heartbeat event, and the like), requested content identification or name, a time associated with the event, a device identification, the platform on which the requested content is to be provided or is being provided, a location associated with a user device or content request, or the like. Content authorizing device 318 may then analyze and compare information in these 1050 messages to, for example, credential information (e.g., account information) associated with each of the 1050 user devices. Based on this comparison, content authorizing device 318 may then authorize one or more content steams that include the requested content. In some embodiments, content authorizing device 318 may determine the content stream authorization using a content platform specific authorization system depending on which platform a user device requested access to content.

In one example, content authorizing device 318 may determine how many content requests are for a particular content platform, such as a linear content platform, media (video/audio) on-demand content platform, time-shifted content platform, mobile content platform, a service provider-specific content platform, an online content platform, and the like. Alternatively, message processor 336 may determine how many content requests are for a particular platform. In this example, there may be 50 interactive content requests, 400 linear content requests, 250 mobile content requests, and 300 online content requests. Out of these, 100 linear content requests, 50 mobile content requests, and 150 online content requests may be denied authorization by content authorizing device 318, and 50 interactive, 300 linear content requests, 200 mobile content requests, and 150 online content requests may be granted authorization by content authorizing device 318. Subsequently, content authorizing device 318 may instruct content server 303 to transmit content streams to the authorized user devices and not to unauthorized user devices. Content authorizing device 318 may then transmit the messages received from the user devices (e.g., authorized user devices) to message broker 332, which may be subsequently transferred to message processor 336. In other examples, the content requests may include requests for time-shifted and/or DVR content.

On the message processor 336 level, message processor 336 may analyze and determine from the received messages a variety of information, such as type of user device (e.g., set-top box, smartphone, tablet, and the like), device identification, credential and account information, type of event associated with the content request, time of request or event, content identification, location of device or content request, and the like. Message processor 336 may then relate any item(s) of information with any other item(s) of information to obtain, for example, a count and/or a viewership quantity. In the above example, a count may be determined to be 100 (authorized) smartphones requesting access to a content item using a mobile content platform and 125 (authorized) laptops requesting access to a content item using an online content platform. Additionally, a viewership quantity may be determined to be, for example, 400 (total) linear content platform requests/events out of a total of 1050 requests/events. A viewership quantity may be determined to be 50 set-top box requests/approvals out of 350 total set-top box requests/approvals (50 for the interactive content and 300 for the linear content) for the 1050 total requests. Additionally, a viewership quantity may be determined to be, for example, 150 (unauthorized) online content platform requests/events out of a total of 1050 requests/events or 300 total online requests/events. In some embodiments, the type of connection (e.g., WiFi, wireless, 4G, LTE, QAM, fiber, cellular, coaxial, etc.) for authorized and/or unauthorized requests may also be captured and used in determining a viewership quantity. For example, if 300 linear content platform requests/events out of a total of 1050 requests/events were authorized, then a viewership quantity may include that 150 of those 300 linear content requests requested access via a 4G connection, and the other 150 of those 300 linear content requests requested access via a WiFi connection. According to some embodiments, from the time a device requests content until the determination of the viewership quantity may happen in substantially real-time.

According to some embodiments, data may be offloaded to third parties for analyses. These third parties may include data aggregators, ratings, providers, content providers, and the like. In some situations, some data may be analyzed by a third party and some data may be analyzed by, e.g., local office 103. Local office 103 may then use the data analyzed by the third party in determining, for example, viewership quantities. Additionally, the third parties may use data analyzed by local office 103 for various purposes, such as modifying and/or enhancing content.

Additionally, a viewership quantity may be determined to be a particular number of devices in a certain location are requesting access to a content item. In some embodiments, a viewership quantity may be determined to track content consumption at a household, account, or device level. For example, it may be determined that an account accesses information primarily with one or more content platform, or alternatively, sparingly uses one or more content platforms. For example, it may be determined that devices associated with an account primarily use a linear content platform and sparingly use media an on-demand content platform. In such an example, a service provider (such as local office 103) or content authorizing device 318 may communicate with those devices associated with that account to provide information regarding access to an on-demand content platform (i.e., the underused platform). In some situations, the service provider may establish a threshold usage level in determining whether a platform is underused or not. Additionally, the service provider may adjust fees charged or network resources (such as data transmission speeds) for various content or platforms based on the amount a device accesses the content or platforms.

Additionally, it may be determined (e.g., based on heartbeat events and any metadata related to the accessed content) whether a device actually accessed content (e.g., in a regular playing speed), such as determining whether or not a device fast forwarded through any content. In some embodiments, certain metadata associated with a content item may be known by the service provider. Such metadata may include when content aired or is broadcasted, and the length of a content item, which day of the week content is aired or broadcasted, which advertisers are going to advertise, and the like. For example, message processor 336, using events related to accessing content, may determine when a user switched a channel, switched content items, fast forwarded, or the like when an advertisement (or other part of transmitted content) is accessed.

According to some embodiments, a viewership quantity may be determined to be a particular number of devices requesting access content with interactive elements and/or events (e.g., interactive requests for and/or associated with content, advertisements, games, etc.). For example, 1000 users may request access to gaming content via a network (e.g., network 342 and/or network 316). Of those 1000 users, 500 may request access for game A, of which 475 may be granted access to game A, and 500 users may request access for game B, of which 450 may be granted access to game B. Thus, a viewership quantity may be determined to be 475 users accessing game A and 450 users accessing game B. According to some embodiments, a viewership quantity may be determined for tracking whether a user or user device accessed interactive content after an initially requesting access to other content. For example, 500 users may request and receive access to a game show program. The game show program may include interactive elements such that users and/or user devices may interact (e.g., by answering questions on the game show, sending messages to the game show, etc.) with the game show. Thus, if 50 users or user devices request access this interactive element of the game show, then system 300 may, for example, compute a viewership quantity based on the requests for this interactive element. In one example, a viewership quantity may be that 50 out of 500 users requested and/or accessed interactive content related to the game show.

According to some embodiments, system 300 may track how many devices as part of the same household may be accessing, such as what content each device may be accessing, which platform(s) is being used, what time of the day, and the like. Then system 300 may aggregate these numbers at the household level, to determine, for example that there are 10 devices, consuming a particular number of hours of content, and watching a particular number of shows and movies, and the like.

At step 418, modifications or enhancements may then be implemented based on a number of counts or a determined viewership quantity associated with a content item. For example, targeted content, such as targeted advertisements may be transmitted to user devices (via, e.g., App Server 107) based on a number of user devices accessing content. Such targeted content may be based on a content platform, a location, a demographic (e.g., age, race, sex, and the like), number of viewers, and the like. For example, if it is determined that a lot of devices may be accessing a particular content item, then service providers (such as local office 103) may be able to charge an advertiser more money to transmit an advertisement, because that advertisement would be transmitted to a lot of devices.

Additionally, advertisers may make decisions on what advertisements to use based on a viewership quantity. For example, if an advertiser wants to advertise a new car on a particular network, then the advertiser may pick a popular show for the advertisement. Additionally, if 80% of viewers of that show use an on-demand content platform and 20% of viewers use a linear content platform, then the advertiser may want to direct the advertisement to the on-demand content platform. Additionally, it may be determined that certain users or devices tend to watch/access (e.g., access in a normal manner) advertisements, which may be derived on historical data. For example, these users/devices may not fast forward through advertisements or switch to another content item during an advertisement. Thus, an advertiser (or content provider) may base a decision on which advertisements to transmit to a user device depending on a tendency of a user or device.

In some embodiments, a list of the most accessed content items (either currently or for a particular past time frame) maybe be determined and displayed on a user device. For live television, a top list may be displayed, for example, while a program is airing. Thus, a user may be informed about the popularity of shows, and may be provided with this popularity in a variety of ways, such as popularity by content platform, by device type, by location, by demographic, and the like. In some embodiments, a popular list of DVR recordings (e.g., via DVR related events) may be generated. In some embodiments, popularity may be determined for on-demand content, online content, mobile content, and the like. In some embodiments, popularity may be determined across television channels, service providers, internet sites, mobile applications, and the like. In some embodiments, popularity may be determined for dates (e.g., days of the week) or times (e.g., time of day) during the day.

At step 420, it is determined whether there may be more events associated with content requests generated at, for example, devices 302a or 302b. If it is determined at step 420 that there are more events, then the process returns to step 402. If it is determined at step 420 that there are no more events, then the process may end at step 424. Otherwise, the process may continue for as long as a data and/or a power connection is maintained.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
  receiving, by one or more computing devices and from a user device, a request for access to a content item, wherein the request comprises an indication of a content platform on which the content item is to be provided;
  receiving, by the one or more computing devices and from the user device, a plurality of indications that the user device is accessing the content item, wherein different indications of the plurality of indications are received at periodic intervals, and wherein each indication of the plurality of indications corresponds to a trick play operation corresponding to a respective different portion of the content item;
  determining, based on the plurality of indications, an accessed amount of the content item that was accessed by the user device via the content platform;
  updating, based on the content platform and based on a comparison between the accessed amount of the content item and a threshold amount of the content item, a viewership quantity metric associated with the content item;
  determining, based on the updated viewership quantity metric, a popularity of the content item; and
  causing display of output associated with the popularity of the content item on a display screen.

2. The method of claim 1, further comprising:
  tracking different viewership quantity metrics associated with the content item; and
  segregating the different viewership quantity metrics based on different types of user devices.

3. The method of claim 1, further comprising:
  tracking different viewership quantity metrics associated with the content item; and
  segregating the different viewership quantity metrics based on different types of network connections used to request the content item.

4. The method of claim 1, wherein the trick play operation corresponds to one or more of:
  pausing the content item, rewinding the content item,
  fast forwarding the content item,
  playing the content item in slow motion,
  resuming the content item,
  fast rewinding the content item,
  slow forwarding the content item,
  slow rewinding the content item, or
  jumping to a previous or future frame of the content item.

5. The method of claim 1, further comprising:
  determining, based on the viewership quantity metric, device usage of the content platform; and
  providing, based on the device usage of the content platform satisfying a predetermined threshold, support for the content platform.

6. The method of claim 1, further comprising:
  receiving, at irregular intervals during a period in which the user device is performing different trick play operations corresponding to the content item, a second plurality of indications.

7. A method comprising:
  receiving, by one or more computing devices and from a user device, a request for access to a content item, wherein the request comprises an indication of a content platform on which the content item is to be provided;
  receiving, by the one or more computing devices, from the user device, and over periodic intervals during a duration that the content item is being accessed by the user device, a plurality of indications that the user device is accessing the content item, wherein each indication of the plurality of indications corresponds to a trick play operation corresponding to a respective different portion of the content item;
  updating, based on the content platform and the plurality of indications, a viewership quantity metric associated with the content item;
  determining, based on the updated viewership quantity metric, a popularity of the content item; and
  causing display of output associated with the popularity of the content item on a display screen of the user device.

8. The method of claim 7, wherein at least one indication of the plurality of indications further corresponds to recording of the content item.

9. The method of claim 7, wherein the updating the viewership quantity metric comprises:
  aggregating other indications received from other user devices of a same household with the plurality of indications received from the user device, wherein the other indications indicate that the other user devices are accessing the content item.

10. The method of claim 7, wherein the trick play operation further corresponds to one or more of:
  a pause operation performed by the user device; or
  a resume operation performed by the user device.

11. The method of claim 7, wherein updating the viewership quantity metric comprises:
  determining, based on the plurality of indications, an accessed amount of the content item that was accessed by the user device.

12. The method of claim 11, wherein updating the viewership quantity metric further comprises:

increasing, based on a determination that the accessed amount of the content item exceeds a threshold, the viewership quantity metric.

13. The method of claim 7, further comprising:
tracking different viewership quantity metrics associated with the content item; and
segregating the different viewership quantity metrics based on different types of user devices.

14. The method of claim 7, further comprising:
tracking different viewership quantity metrics associated with the content item; and
segregating the different viewership quantity metrics based on different types of network connections used to request the content item.

15. The method of claim 7, further comprising:
determining an account associated with the user device; and
tracking content access employing the account.

16. A method comprising:
transmitting, by a user device and during a period in which the user device is accessing a content item via a content platform, a first indication at a first time, wherein the first indication indicates that the user device is performing a first trick play operation corresponding to a first portion of the content item;
transmitting, by the user device and during the period in which the user device is accessing the content item via the content platform, a second indication at a second time, wherein the second indication indicates that the user device is performing the first trick play operation corresponding to a second portion of the content item;
transmitting, by the user device and after the period in which the user device is accessing the content item via the content platform, a third indication at a third time, wherein the third indication indicates that the user device is performing a second trick play operation corresponding to a third portion of the content item;
receiving, by the user device, data associated with a popularity of the content item, wherein the popularity is determined based on the content platform and is further based on a plurality of indications comprising the first, second, and third indications; and
outputting, for display, the data associated with the popularity of the content item on a screen associated with the user device.

17. The method of claim 16, wherein the plurality of first trick play operation further corresponds to one or more of:
a pause operation performed by the user device; or
a resume operation performed by the user device.

18. The method of claim 16, further comprising:
tracking different viewership quantity metrics associated with the content item, wherein the different viewership quantity metrics are based on the popularity of the content item; and
segregating the different viewership quantity metrics based on different types of user devices.

19. The method of claim 16, further comprising:
tracking different viewership quantity metrics associated with the content item, wherein the different viewership quantity metrics are based on the popularity of the content item; and
segregating the different viewership quantity metrics based on different types of network connections used to request the content item.

20. The method of claim 16, further comprising:
determining an account associated with the user device; and
tracking content access employing the account.

* * * * *

UNITED STATES PATENT AND TRADEMARK OFFICE
CERTIFICATE OF CORRECTION

PATENT NO. : 10,708,651 B2  
APPLICATION NO. : 14/296113  
DATED : July 7, 2020  
INVENTOR(S) : Ilirjan Papa Page 1 of 1

It is certified that error appears in the above-identified patent and that said Letters Patent is hereby corrected as shown below:

In the Drawings

Sheet 5 of 5, Fig, 5:  
Please delete "Requets" and insert --Requests--

In the Specification

Column 4, Detailed Description, Line 56:  
Please delete "modern" and insert --modem--

Column 10, Detailed Description, Line 16:  
Please delete "332)" and insert --334)--

In the Claims

Column 24, Claim 17, Line 11:  
Before "first", delete "plurality of"

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*